United States Patent [19]

Utsumi et al.

[11] Patent Number: 4,931,925

[45] Date of Patent: Jun. 5, 1990

[54] HIGH SPEED BYTE DATA REARRANGING PROCESSOR

[75] Inventors: Tohru Utsumi, Yokohama; Tohru Sasaki, Kawasaki, both of Japan

[73] Assignee: Kabushiki Kaisha Toshiba, Kawasaki, Japan

[21] Appl. No.: 219,344

[22] Filed: Jul. 15, 1988

[30] Foreign Application Priority Data

Jul. 24, 1987 [JP] Japan .................. 62-183764

[51] Int. Cl.⁵ .............................. G06F 7/00
[52] U.S. Cl. .................. 364/200; 364/964.6; 364/964; 364/243; 364/260; 364/715.08
[58] Field of Search ... 364/200 MS File, 900 MS File, 364/715.08

[56] References Cited

U.S. PATENT DOCUMENTS

| B1 533,454 | 3/1976 | Moran | 364/200 |
| 4,296,465 | 10/1981 | Lemak | 364/200 |
| 4,319,323 | 3/1982 | Ermolovich et al. | 364/200 |
| 4,502,111 | 2/1985 | Riffe et al. | 364/200 |
| 4,527,236 | 7/1985 | Ermolovich | 364/200 |
| 4,653,019 | 3/1987 | Hodge et al. | 364/900 |
| 4,682,281 | 7/1987 | Woffinden et al. | 364/200 |

*Primary Examiner*—Gareth D. Shaw
*Assistant Examiner*—Gopal C. Ray
*Attorney, Agent, or Firm*—Foley & Lardner, Schwartz, Jeffery, Schwaab, Mack, Blumenthal & Evans

[57] ABSTRACT

To rearrange the arrangement order of a byte data read from an external memory into a data arrangement order suitable for a microprocessor or the arrangement order of a byte data read from an internal memory into a data arrangement order suitable for an external memory, the byte data is rotated by a rightward byte rotator or a leftward byte rotator provided between an internal bus and an external bus without depending upon software, thus increasing data arrangement speed and decreasing data access time and program storing capacity.

6 Claims, 6 Drawing Sheets

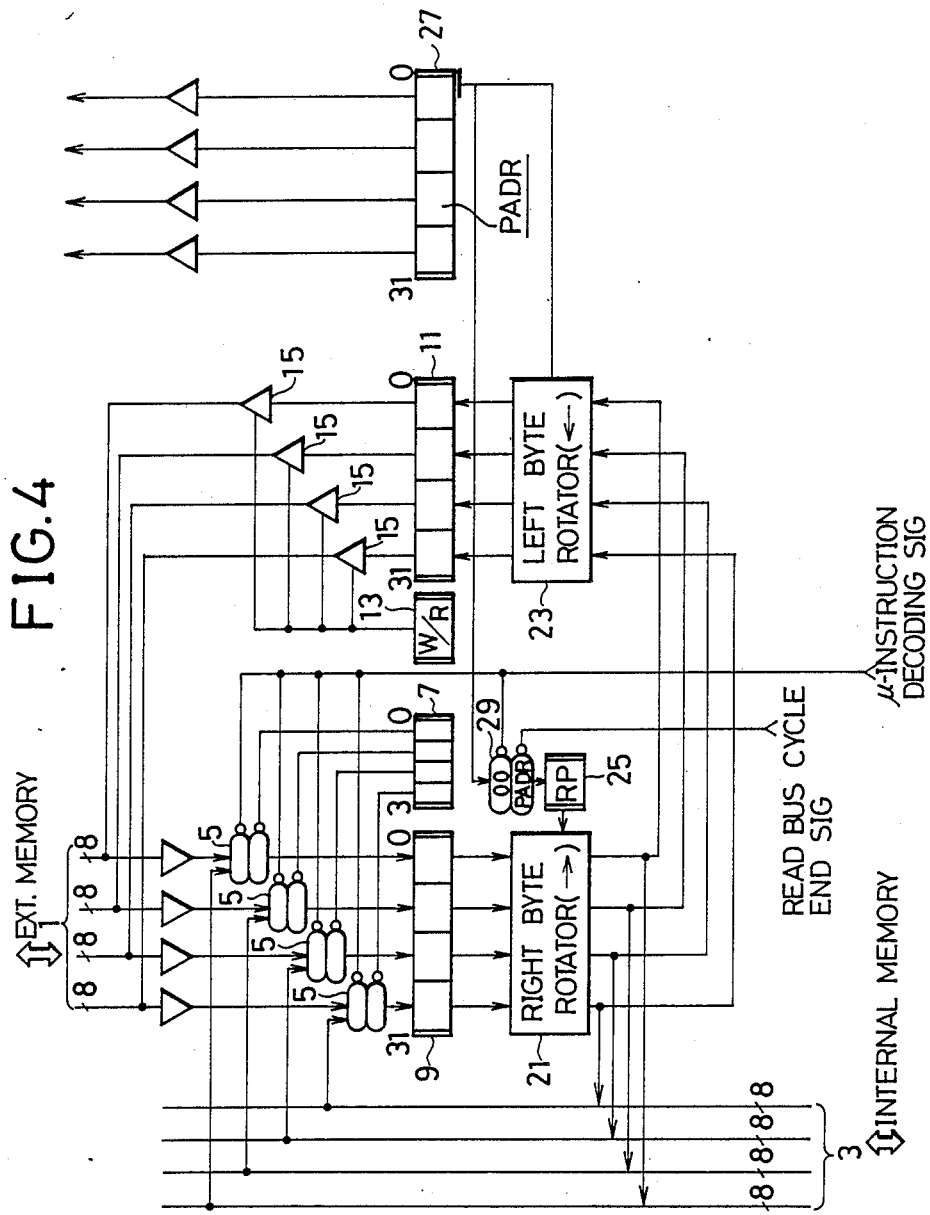

HIGH SPEED BYTE DATA REARRANGING PROCESSOR

BACKGROUND OF THE INVENTION

1. Field of the Invention

The present invention relates to a data processor for changing the arrangement order of a byte data so that the data can be transferred between internal and external memory devices of the processor at high speed.

2. Description of the Prior Art

A microprocessor is connected to an external memory via an external bus. To implement interface between the external bus and an internal bus of the microprocessor, a data processor is necessary for the microprocessor. In the case of a 32-bit microprocessor, for instance, 4-byte memory operand data are transferred between the external memory and the data processor. These data are usually transferred for each byte unit. In data transfer operation, the least significant bit (LSB) of the data must match the LSB of the data transferred to the internal bus, internal registers and external bus.

In the prior-art data processor, when the arrangement order of data stored in the external memory is different from that of data to be processed within the microprocessor, since the data arrangement is changed in accordance with software stored within the data processor incorporated in the microprocessor, there exist problems in that the data arrangement changing time is required and therefore the access time increases or the processing speed decreases, and additionally the capacity of the memory device increases.

The configuration of the prior-art data processor will be described in further detail hereinafter with reference to FIGS. 1 to 3, under DETAILED DESCRIPTION OF THE PREFERRED EMBODIMENT.

SUMMARY OF THE INVENTION

With these problems in mind, therefore, it is the primary object of the present invention to provide a data processor which can improve data processing speed by changing a data arrangement order of an outputted byte data into that of an inputted byte data at high speed, without depending upon software.

To achieve the above-mentioned object, a data processor for a microprocessor according to the present invention comprises: (a) an internal memory for storing byte data via an internal bus; (b) an external memory for storing byte data via an external bus; (c) selector unit, coupled to the internal and external buses, for selecting byte data stored in said internal memory via the internal bus or stored in said external memory via the external bus; (d)first storing unit (9), coupled to said selector unit, for storing byte data selected by said selector unit; (e) rotating means (21, 23), coupled to said first storing unit and between the internal and external buses, for rotating byte data stored in said storing unit in byte unit into an appropriate data arrangement order suitable for data processing or data storing; (f) second storing unit, coupled to said rotating unit, for storing byte data rotated by said rotating unit; and (g) controlling unit coupled to said rotating means, for generating command signals to said rotating means.

The rotating unit comprises: (a) a rightward byte rotator, coupled to said first storing unit, for rotating a byte data toward a lower significant bit side; and (b) a leftward byte rotator, coupled to said rightward byte rotator, for rotating a byte data toward a higher significant bit side.

The controlling unit comprises: (a) a read pointer, coupled to said rightward byte rotator, for determining a rotate degree of said rightward byte rotator; and (b) a physical address register, coupled to said leftward byte rotator, for determining a rotate degree of said leftward byte rotator.

In the data processor for a microprocessor according to the present invention, since a byte data read from an external memory can be rearranged in byte unit into a data arrangement order suitable for a data processor or a byte data read from an internal memory can be rearranged into a data arrangement order suitable for an external memory through rotating means provided between the internal and external buses, it is possible to increase data arrangement speed and decreasing data access time and program storing capacity.

BRIEF DESCRIPTION OF THE DRAWINGS

The features and advantages of the data processor according to the present invention over the prior-art data processor will be more clearly appreciated from the following description of the preferred embodiment of the invention taken in conjunction with the accompanying drawings in which like reference numerals designate the same or similar elements or sections throughout the figures thereof and in which:

FIG. 4 is a block diagram showing an embodiment of the data processor of the present invention;

DETAILED DESCRIPTION OF THE PREFERRED EMBODIMENTS

To facilitate understanding of the present invention, a reference will be made to a prior-art data processor, with reference to the attached drawings.

Figure 1:
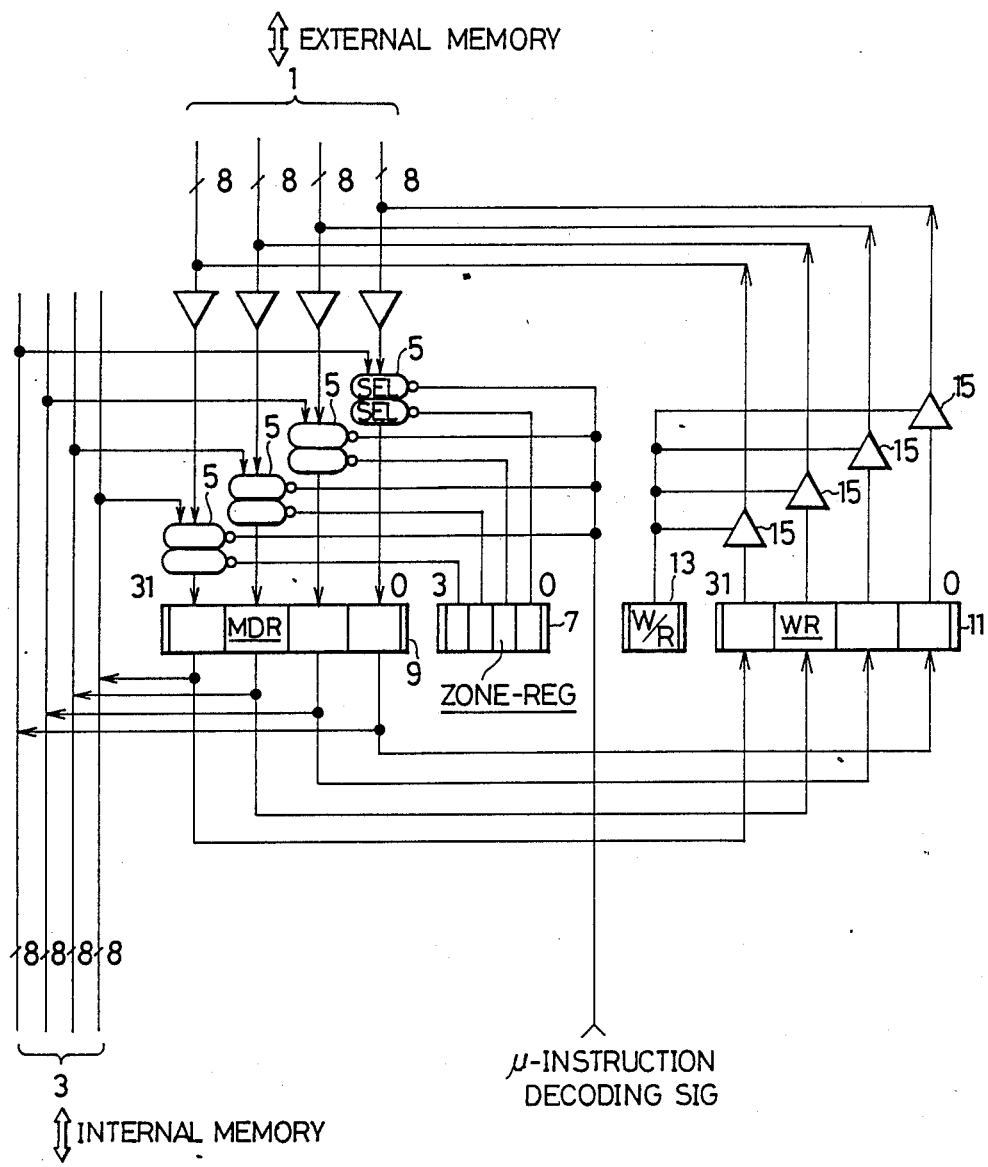
FIG. 1 is a block diagram showing a prior-art data processor.

FIG. 1 shows a block diagram of a prior-art data processor for implementing interface between an external data bus and an internal data bus of a 32-bit microprocessor, for instance. In this data processor, memory operand data composed of 4 bytes and stored in an external memory (not shown) and memory operand data stored in the internal memory (not shown) of the data processor are transferred reciprocatively.

In FIG. 1, data given from an external memory (not shown) via an external data bus 1 or data given from an internal memory (not shown) via an internal data bus 3 are transferred to selectors 5 in byte unit. These selectors 5 select a data given on the external data bus 1 in accordance with designation information stored in a zone register 7 to determine the validity /invalidity of external data or select a data given on the internal data bus 3 in accordance with microinstruction decoding signals.

When data given through the external data bus 1 are selected, these data are stored in a memory data register (MDR) 9 and then stored in the internal memory via the internal data bus 3. On the other hand, when data given through the internal data bus 3 are selected, these data are stored in a write buffer 11 and then stored in the external memory via the external data bus 1 through output buffers 15 controlled in accordance with information stored in a write/read register 13 to designate writing of data into the external memory.

By the way, it is necessary to match the LSB (the least significant bit) of data to be processed in the processor with that of the internal data bus or of the register for temporarily storing a data to be processed in the data processor. For instance, when a 16-bit data is stored in a 32-bit register, this 16 bit data is stored from the 0th bit area (the right side) to the #15 bit area (the left side) in the 32-bit register. The above-mentioned one-direction bit arrangement order is indispensable for a processor for processing variable byte data.

Figure 2:
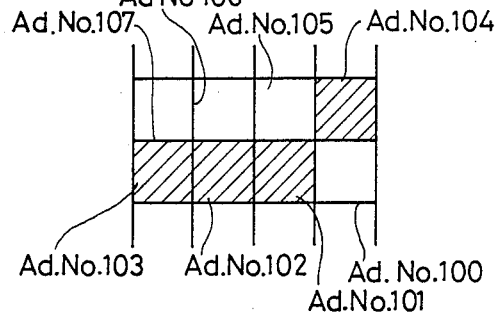
FIG. 2 is a diagram showing an example of byte data storing arrangement.

On the other hand, data stored in the external memory and processed by the data processor are usually stored at any given addresses. For instance, there exists a case where a 4-byte data is stored in order in the external memory as shown in FIG. 2 in such a way that a 4-byte data is stored beginning from Address No. 101 to Address No. 104 byte by byte. In this case, each byte of the external data bus 1 is designated to each address of 4n, 4n+1, 4n+2, 4n+3 (n =0, 1, ...) of the external memory. Further, the external data bus 1 corresponding to an address denoted by 4n is designated to the least significant bit side, and the external bus 1 corresponding to an address denoted by 4n+3 is designated to the most significant bit side.

Therefore, as shown in FIG. 2, when a 4-byte data is accessed from the external memory via the external data bus 1, the LSB of the 4-byte data stored in the external memory is located at the 0th bit of Address No. 101, while the LSB of the data read to the external data bus 1 is located at Address No. 104 of the external memory. In summary, the LSB of the 4-byte data on the external memory does not match that of the data read on the external data bus 1.

In the prior-art data processor, a data read via the external data bus 1 is transferred to a shifter (not shown) via the internal data bus 3; the data transferred to the shifter is rotated in byte unit in accordance with microprogram control so that the LSB of the data read on the external data bus 1 and is then transferred to the data processor matches that of a data stored in the external memory. That is, the data read to the external data bus is changed into a data arrangement order to be processed within the data processor.

Figure 3A:
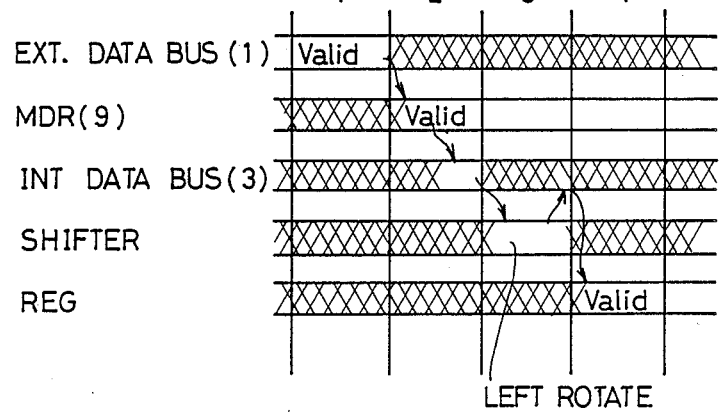
FIG. 3A is a diagram showing a timing chart in which a data is rotated once in the rightward direction by a shifter.

When a data stored in the external memory is written in a register in the data processor, a data read from the external memory to the external bus 1 is stored in the memory data register 9, then transferred from the memory data register 9 to a shifter (not shown) for rotation in accordance with software via the internal data bus 3, and further returned to a register (REG) via the internal data bus 3 before processing, as shown by a timing chart as shown in FIG. 3A.

Further, when a data is written from the data processor to the external memory, the data to be written is previously rotated by a shifter in accordance with software so that the arrangement order matches that of addresses in the external memory.

Further, when a data on the external memory 1 is once read and then returned to another address of the external memory (memory to memory transfer), the data read from the external memory to the external data bus 1 is stored in the memory data register 9, then transferred from the memory data register 9 to a shifter (not shown) for rotation in accordance with software in the data processor via the internal data bus 3 so that the data arrangement order corresponding to the data processor can be obtained, and further rotated so that the data arrangement order is suitable to addresses in the external memory.

Figure 3B:
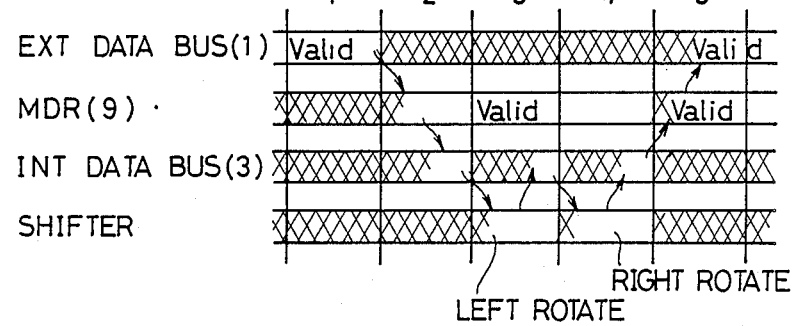
FIG. 3B is a diagram showing a timing chart in which a data is rotated twice in the rightward and leftward directions by the shifter.

As described above, in the prior-art data processor shown in FIG. 1, when the arrangement order of data stored in the external memory is different from that of data to be processed within the data processor, the data arrangement order is changed in accordance with software stored within the data processor. Therefore, it takes a data matching time between data stored in the external memory and data to be processed in the data processor as shown in FIGS. 3A and 3B, there exists a problem in that the access time increases and therefore the processing speed decreases. In addition, since the above data matching is implemented by software (i.e. microprograms), there exists another problem in that the capacity of the memory device for storing the microprograms increases.

In view of the above description, reference is now made to an embodiment of the data processor according to the present invention.

FIG. 4 shows a system configuration of an embodiment of the data processor according to the present invention. In this data processor shown in FIG. 4, before a 4-byte data read from the external memory (not shown) or the internal memory (not shown) is given to the internal data bus 3 or the external data bus 1, the data arrangement order is changed from that of data to be processed within the data processor (i.e. microprocessor) to that of data to be stored in the external memory or vice versa.

The system shown in FIG. 4, the same elements having the same functions as those already shown in FIG. 1 are designated by the same references without repeating any further detailed description of them.

In FIG. 4, in addition to the configuration shown in FIG. 1, the data processor comprises a rightward byte rotator 21 for circulating (rotating) a given 4-byte data toward the lower significant bit side (rightward in the drawing); a leftward byte rotator 23 for rotating the 4-byte data given by this right byte rotator 21 toward the higher significant bit side (leftward in the drawing); a read pointer (RP) 25 for determining a rotate rate of this left byte rotator 23 and a physical address register (PADR) 27 for determining a rotate rate of the right byte rotator 21; and a selector 29 for selecting a value to be stored in the read pointer 25.

The rightward byte rotator 21 rotates a 4-byte data given from the memory data register 9 in byte unit toward the lower significant bit side. That is to say, when (00) is stored in the read pointer 25, for instance, the given 4-byte data is not rotated; when (01) is stored, the data is rotated by a byte; when (10) is stored, the data is rotated by 2 bytes; when (11) is stored, the data is rotated by 3 bytes. This rotated 4-byte data is given in byte unit to the internal bus 3 or the leftward byte rotator 23.

The leftward byte rotator 23 rotates a 4-byte data given from the rightward byte rotator 21 in byte unit to the higher significant bit side. That is to say, when 2 lower significant bits of the physical address register 27 are (00), the given 4-byte data is not rotated; when (01), rotated by 1 byte; when (10), rotated by 2 bytes; when (11), rotated by 3 bytes. This rotated 4-byte data is stored in a write buffer 11.

Figure 5A:
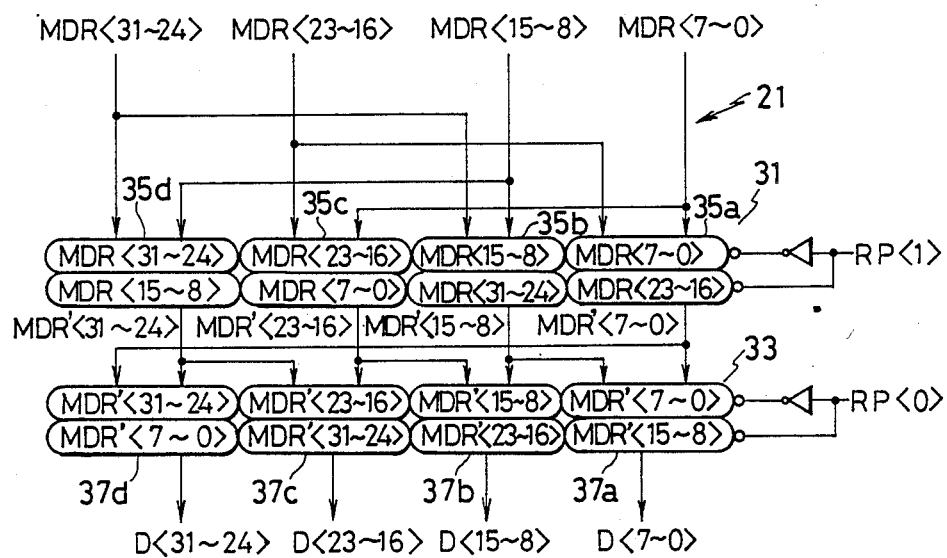
FIGS. 5A is a block diagram showing a rightward byte rotator configuration incorporated in the data processor shown in FIG. 4.
Figure 5B:
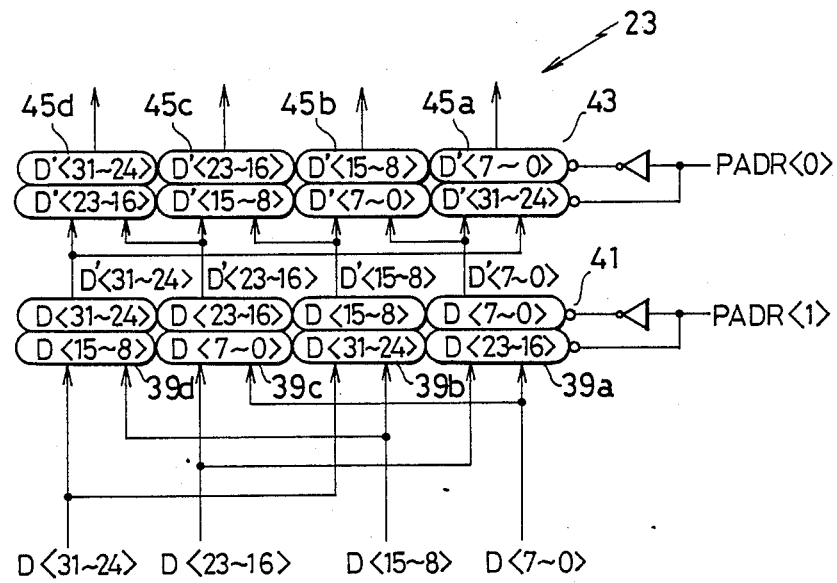
FIG. 5B is a block diagram showing a leftward byte rotator configuration incorporated in the data processor shown in FIG. 4.

These rightward byte rotator 21 and the leftward byte rotator 23 can be configured as shown in FIGS. 5A and 5B.

FIG. 5A shows a practical configuration of the rightward byte rotator 21. In the drawing, the rightward byte rotator 21 comprises two sets of selector sections 31 and 33.

The select section 31 is made up of four selectors 35a, 35b, 35c and 35d each corresponding to each byte of a 4-byte data given from the memory data register 9, and selects a data given from the memory register 9 on the basis of the higher bit of a 2-bit data stored in the read pointer 25. The selected data is given to the selector section 33.

That is, when the higher bit of the read pointer 25 is "0", the selector 35a selects the 1st byte (0 to 7 bits) from a data given from the memory data register 9; the selector 35b selects the 2nd byte (8 to 15 bits); the selector 35c selects the 3rd byte (16 to 23 bits); the selector 35d selects the 4th byte (24 to 31 bits). On the other hand, when the higher bit of the read pointer 25 is "1", the selectors 35a, 35b, 35c and 35d select the 3rd byte, the 4th byte, the 1st byte and 2nd byte of a data given to the memory register 9, respectively.

Therefore, when the higher bit of the read pointer 25 is "0", the data given from the memory data register 9 will not be rotated; when the higher bit of the read pointer 25 is "1", the data is rotated by 2 bytes in the rightward direction.

The selector section 33 is composed of 4 selectors 37a to 37d so as to correspond to the selectors 35a to 35d, respectively, and selects data given from each selector 35a to 35d on the basis of the lower bit of a 2-bit data stored in the read pointer 25.

That is, when the lower bit of the read pointer 25 is "0", the selector 37a selects an output of the selector 35a; the selector 37b selects an output from the selector 35b; the selector 37c selects an output from the selector 35c; and the selector 35d selects an output from the selector 35d, respectively. On the other hand, when the lower bit of the read pointer 25 is "1", the selector 37a selects an output from the selector 35b; the selector 37b selects an output from the selector 35c; the selector 37c selects an output from the selector 35d; and the selector 37d selects an output from the selector 35a.

Therefore, a 4-byte data given from the selectors 35a to 35d is not rotated when the lower bit of the read pointer 25 is "0", but rotated by one byte in the rightward direction when the lower bit thereof is "1".

As described above, in the configuration as shown in FIG. 5A, the 4-byte data given from the memory data register 9 is rotated by 0 to 3 bytes according to the value of the read pointer 25.

FIG. 5B shows a practical configuration of a leftward byte rotator 23. This left byte rotator 23 comprises a selector section 41 for selecting data on the basis of the higher bit of the 2 lower bits of the physical address register 27 and a selector section 43 for selecting data on the basis of lower bit of the 2 lower bits of the physical address register 27.

The selector 41 includes selectors 39a to 39d. When the higher bit of the 2 lower bits of the physical address register 27 is "0", these selectors 39a to 39d select the 1st byte output, the 2nd byte output, the 3rd byte output and 4th byte output of the right byte rotator 21, respectively. When the higher bit is "1", these selectors select the 3rd byte output, 4th byte output, 1st byte output and 2nd byte output of the right byte rotator 21. That is, when the higher bit of the 2 lower bits of the physical address register 27 is "0", the selector 41 will not rotate an output of the right byte rotator 21, but when the higher bit is "1", the selector 41 rotates the output by 2 bytes in the leftward direction.

The select section 43 is composed of selectors 45a to 45d. When the lower bit of the 2 lower bits of the physical address register 27 is "0", each selectors 45a to 45d select outputs of each corresponding selectors 39a to 39d. when the lower bit of the 2 lower bits of the physical address register 27 is "1", each selectors 45a to 45d select outputs of each corresponding selectors 45d, 45a, 45b and 45c. That is, when the lower bit of the 2 lower bits of the physical address register 27 is "0", each output of each selector 39a to 39b is not rotated; when the lower bit is "1", each output thereof is rotated by one byte.

Therefore, in the configuration shown in FIG. 5B, the 4 byte data given from the right byte rotator 21 is rotated by 0 to 3 bytes according to the value of the 2 lower bits from the physical address register 27.

Returning to FIG. 4 again, the read pointer (RP) 25 stores a 2-bit data. As already described, a data is rotated by the right byte rotator 21 by a rotate value corresponding to the 2-bit value stored in this read pointer 25.

The physical address register 27 stores a 32-bit address given to the external memory when the external memory is accessed. The 2 lower bits of the stored address are given to the leftward byte rotator 23 and the selector 29.

The selector 29 selects the 2 lower bits stored in the physical address register 27 in response to the read bus cycle end signal or "00" in response to a microinstruction code signal. The selected 2 bit values are given to the read pointer 25.

As described above, an embodiment of the data processor is constructed. The operation of this embodiment will be explained with reference to timing charts shown in FIGS. 6A and 6B.

First, the case where a 4-byte data stored in the external memory is read to the data processor and then written into the internal memory will be explained.

When a 4-byte data is read from the external memory on the basis of an address stored in the physical address register 27, this read 4-byte data is given byte by byte to each corresponding selector 5 via the external bus 1. Each selector 5 discriminates the validity/invalidity of one byte data given in accordance with information stored in the zone register 7. When valid, the given data is transferred to the memory data register 9. Here, an assumption is made that all the 4-byte data given to each selector 5 are valid. At the same time, the 2 lower bits of the physical address register 27 are selected from the selector 29 in accordance with the read bus cycle end signal, and then the selected 2 lower bits values are stored in the read pointer 25.

The data stored in the memory register 9 is given to the rightward byte rotator 21 and then rotated in accordance with the 2-byte data of the read pointer 25.

Here, an assumption is made that a 4-byte data is stored at Address Nos. from 101 to 104 of the external memory as shown in FIG. 2. When the 4-byte data is stored in the external memory, since the 2 lower bits of the physical address register 27 becomes (01), 2 bits of (01) are stored in the read pointer 25.

By this, the 4-byte data given to the rightward byte rotator 21 is rotated one byte by the rightward byte rotator 21 in the rightward direction. That is, the data is arranged with the one-byte data stored at Address No. 104 of the external memory located on the least significant side and with the one-byte data stored at Address No. 103 thereof located on the most significant side. Further, the 4-byte data given to the rightward byte rotator 21 is rearranged with the one-byte data stored at Address No. 101 located on the least significant side and with the one-byte data stored at Address No. 104 located on the most significant side. The 4-byte data rotated for rearrangement is given to the corresponding data bus 3, and then stored in an internal memory (Reg) (not shown) for processing.

As described above, the 4-byte data stored in the external memory as shown in FIG. 2 are rearranged with a data stored at Address No. 101 located on the least significant side so as to be processed within the data processor.

Figure 6A:
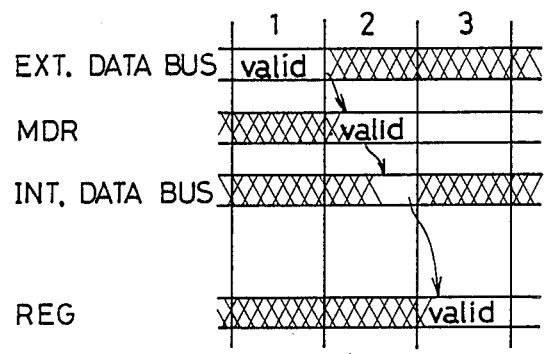
FIGS. 6A and 6B are timing charts for assistance in explaining the operation of the data processor shown in FIG. 4.

Therefore, since the data are rearranged into a data arrangement order which can be processed within the processor before the data are given to the internal data bus 3 and further, as shown in FIG. 6A, stored in the internal memory (Reg) via the internal data bus 3, it is possible to store data read from the external memory into the internal memory (Reg) at higher speed as compared with the prior-art processor in which the data are rotated by a shifter within the processor in accordance with software and then stored in the internal memory (Reg) via the internal data bus 3 as shown in FIG. 3A.

The case where a 4-byte data is read from the internal memory (Reg) and written into the external memory will be explained hereinbelow.

When the 4-byte data stored in the internal memory in accordance with internal data arrangement order is read from the internal memory to the internal data bus 3, this read 4-byte data is given to each corresponding selector 5 byte by byte. The data given is selected by the selector 5 in accordance with the microinstruction decode signal, and then stored in the memory data register 9. At the same time, the (00) value selected from the selector 29 on the basis of the microinstruction decode signal is stored in the read pointer 25.

By this, the 4-byte data given from the memory data register 9 to the rightward byte rotator 21 is given to the leftward byte rotator 23 without rotation. The 4-byte data given to the leftward byte rotator 23 is rotated in accordance with the 2 lower bit values of the physical address register 27 which stores an address of the external memory. Here, when the data read from the internal memory is stored as shown in FIG. 2, since the 2 lower bits of the physical address register 27 are (01), the 4-byte data given to the left byte rotator 23 is rotated by one byte in the leftward direction.

The rotated data is stored in the output buffer register 11 and then given from the external data bus 1 to the external memory via the output buffer 15. Therefore, the 4-byte data read from the internal memory is stored in the external memory, as shown in FIG. 2, with the one-byte data on the least significant bit side located at Address No. 101 and with the one-byte data on the most significant bit side located at Address No. 104.

Next, the case where a 4-byte data is read from the external memory and then immediately written at another addresses of the external memory will be described hereinbelow.

First, the 4-byte data designated by an address stored in the physical address register 27 is given from the external memory to the external data bus 1, this data is given to the memory data register 9 via the selector 5. Further, at the same time 2 lower bits of the physical address register 27 are stored in the read pointer 25 via the selector 29.

At the same time, an address to rewrite a transferred data in the external memory is stored in the physical address register 27.

The data stored in the memory data register 9 is given to the rightward byte rotator 21; rotated in accordance with the value of the read pointer 25; transformed once into the internal arrangement order; and then given to the leftward byte rotator 23.

By this, a data given to the leftward byte rotator 23 is rotated in the leftward direction in accordance with the 2 lower bits stored in the physical address register 27 so as to be transformed into an arrangement order to be stored in the external memory. The transformed data is given to the output buffer 11 and stored, and thereafter written at an address stored in the physical register 27 of the external memory from the corresponding external data bus 1 via the output buffer 15 for each byte.

Figure 6B:
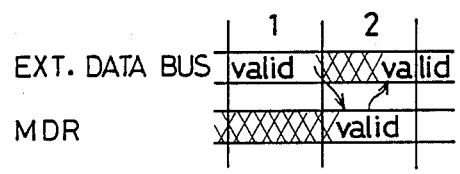

As described above, even when a data is transferred from the external memory and returned to another addresses of the same external memory, as shown in FIG. 6B, since data can be transferred without use of the internal shifter, it is possible to transfer data at high speed as compared when the rightward and leftward rotations are implemented by the internal shifter via the internal data bus 3, as shown in FIG. 3B.

Figure 7:
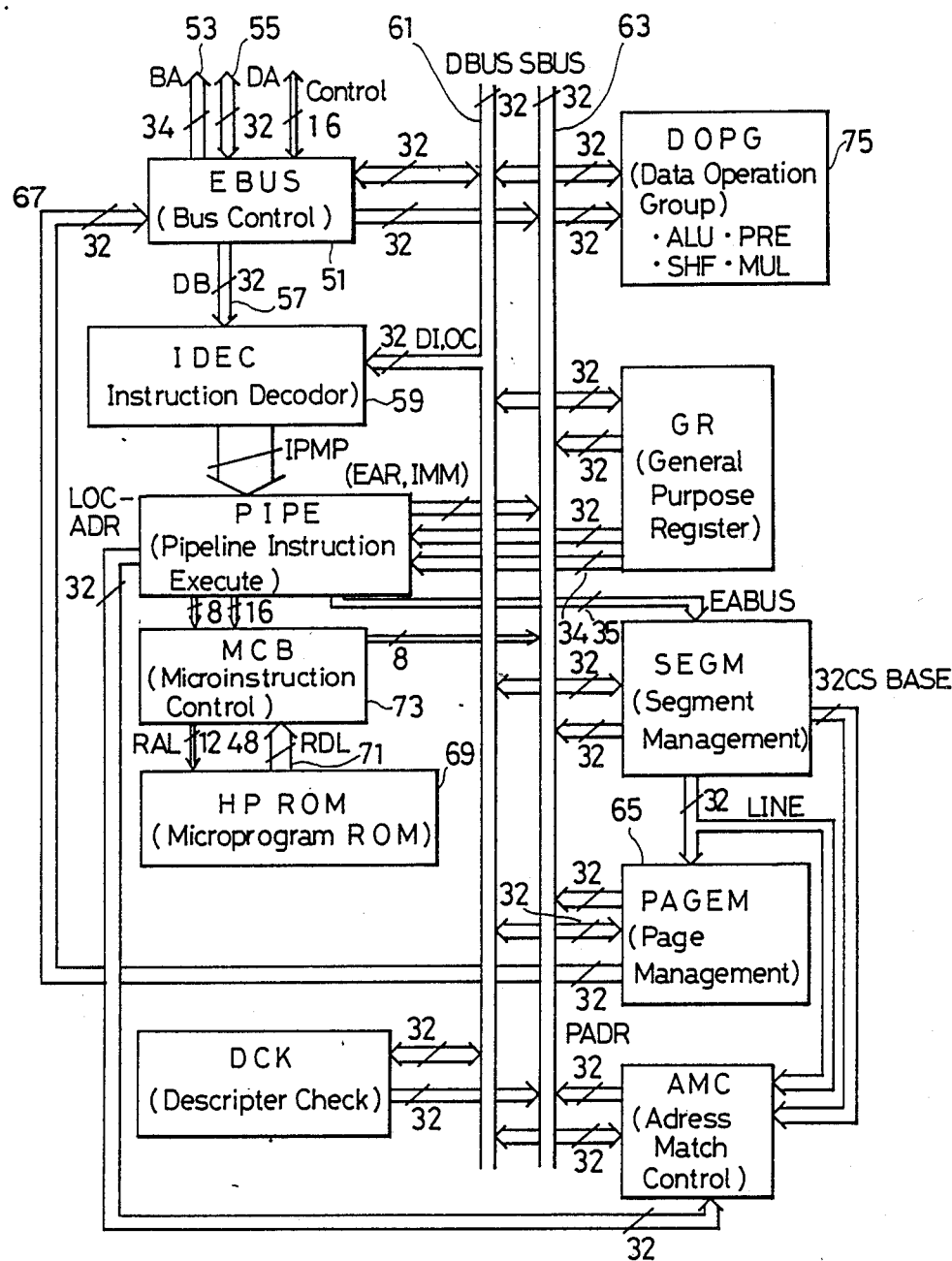
FIG. 7 is a block diagram showing an entire system configuration of the data processor for a microprocessor.

FIG. 7 is a block diagram showing the entire configuration of a data processing system to which the data processor shown in FIG. 4 is applied.

In FIG. 7, an EBUS (Bus control) block 51 includes the data processor shown in FIG. 4 to transfer data and instructions between the data processing system shown in FIG. 7 and the external device (not shown). The data and the instruction address are transferred to the external device via a 34-bit BA bus 53, and the data are inputted or outputted via the 32-bit DA bus 55. The instructions read into the EBUS block 51 are given to an IDEC (Instruction Decoder) block 59 via a 32-bit DB bus 57, and then decoded.

Further, the data read in the EBUS block 51 are inputted or outputted between each block within the system via the internal buses of DBUS 61 and SBUS 63. An address sent out from the EBUS block 51 to the outside via the BA bus 53 is calculated by a PAGEM (Page Management) block 65 and then given to the EBUS block 51 via a PADR bus 67.

A MPROM (Micro Program ROM) block 69 is a ROM for storing a microprogram. The microprogram stored in this MPROM block 69 is given to the MCB (Microinstruction Control) block 73 via a 48 bit RDL bus 1, decoded by this MCB block 73, and processed by a DOPG (Data Operation Group) block 75 including an ALU, shifters, etc.

As described above, in the data processor according to the present invention, since byte data outputted from one of storing means are circulated by the rotating means disposed between buses serving as input/output paths of byte data without depending upon the program control, it is possible to change the data arrangement order of the inputted byte data into that appropriate to outputted byte data at high speed, thus shortening the access time of the byte data and improving the processing speed.

Further, since the arrangement order of the byte data is transformed by hardward, no program is required to change the arrangement order of the byte data, thus reducing the capacity of the memory device for storing programs.

What is claimed is:

1. A data processor interfacing system, for use with a data processor, for reciprocally transferring data in an appropriate data order between an internal memory of said data processor and an external memory via an internal bus coupled to said internal memory and an external bus coupled to said external memory, respectively, said system comprising:
   first coupling means for coupling said system to said internal bus;
   second coupling means for coupling said system to said external bus;
   selector means, having an input coupled to both said first coupling means and said second coupling means for receiving internal byte data outputted to said internal bus from said internal memory and for receiving external byte data outputted to said external bus from said external memory, for selecting and providing valid byte data at a selector output;
   first storage means coupled to said selector output for storing said valid byte data and providing said valid byte data at an output;
   rotating means for receiving said valid byte data from said first storage means and for rotating said valid byte data into said appropriate data order to provide rotated data at a rotating means output;
   second storage means having an input;
   third coupling means for coupling said rotating means between said output of said first storage means and said input of said second storage means;
   said second storage means receiving said rotated data from said rotating means output for storing and outputting said rotated data to said second coupling means; and
   controlling means for providing command signals received from said data processor for determining a rotation amount for said rotating means.

2. A system as claimed in claim 1, wherein said rotating means comprises:
   rightward byte rotator means having an input for receiving said valid byte data and for rotating said valid byte data toward a lower significant bit side to provide a rightward rotator output;
   leftward byte rotator means having an input for receiving said valid byte data and for rotating said valid byte data toward a higher significant bit side to provide a leftward rotator output;
   means for coupling said input of one of said rightward and leftward rotator means for first receiving said valid byte data from said first storage means;
   means for coupling said output of said one of said rotator means to said input of the other of said rightward and leftward rotator means and to said fourth coupling means;
   said other of said rotator means receiving said valid byte data only from said one of said rotator means and providing said rotated data.

3. A system as claimed in claim 2, wherein:
   said one of said rotator means comprises said rightward byte rotator means;
   said other of said rotator means comprises said leftward byte rotator means; and
   said controlling means comprises physical address register means for determining said rotation amount for said leftward byte rotator means and read pointer means for determining said rotation amount for said rightward byte rotator means in response to said physical address register means.

4. A method of transferring byte data from an external memory to an internal memory of a data processor in an appropriate byte order, comprising the steps of:
   reading said byte data from said external memory on the basis of an address designated by a physical address register of said data processor to provide outputted byte data;
   selecting valid byte data from among said outputted byte data;
   storing only said valid byte data in a memory register;
   determining a rotation amount for obtaining said appropriate byte order on the basis of the two lowest bits in said physical address register;
   storing said rotation amount in a read pointer in response to a read bus cycle end signal from said data processor;
   transferring said valid byte data from said memory register to a rightward byte rotator;
   rotating said valid byte data in said rotator in accordance with said rotation amount from said read pointer to provide rotated valid byte data in said appropriate byte order;
   storing said rotated valid byte data in said internal memory;
   providing command signals from said data processor; and
   executing all said steps in response to said command signals.

5. A method of transferring byte from an internal memory of a data processor to an external memory in an appropriate byte order, comprising the steps of:
   reading said byte data from said internal memory to provide outputted byte data;
   selecting valid byte data from among said outputted byte data;
   storing only said valid byte data in a memory register;
   determining a rotation amount for obtaining said appropriate byte order on the basis of the two lowest bite in a physical address register of said data processor;
   transferring said valid byte data from said memory register via a rightward byte rotator to a leftward byte rotator;
   rotating said transferred valid byte data in said leftward byte rotator in accordance with said rotation amount to provide rotated valid byte data in said appropriate byte order;
   storing said rotated valid byte data in a buffer memory;

writing said stored rotated valid byte data from said buffer memory into said external memory on the basis of an address in said physical address register;

providing command signals from said data processor; and executing all said steps in response to said command signals.

6. A method of transferring byte data from a first location in an external memory to a second location of said external memory in an appropriate byte order, comprising the steps of:

reading said byte data from said external memory at said first location on the basis of an address designated by a physical address register of a data processor to provide outputted byte data;

selecting valid byte data from among said outputted byte data;

storing only said valid byte data in a memory register;

determining a rightward rotation amount on the basis of the two lowest bits in said physical address register;

storing said rotation amount in a read pointer in response to a read bus cycle end signal from said data processor;

transferring said valid byte data from said memory register to a rightward byte rotator;

rotating said valid byte data in said rotator in accordance with said stored rotation amount to provide right rotated valid byte data;

transferring said right rotated valid byte data to a leftward byte rotator;

rotating said right rotated valid byte data in said leftward byte rotator in accordance with said determined rotation amount to provide left rotated valid byte data in said appropriate byte order;

storing said left rotated byte data in a buffer memory;

writing said stored left rotated byte data from said buffer memory into said second location of said external memory on the basis of an address in said physical address register;

providing command signals from said data processor; and executing all said steps in response to said command signals.

* * * * *